Jan. 2, 1923.

H. W. JOHNSON.
HOSE CLAMP.
FILED APR. 17, 1922.

1,441,154.

Henry W. Johnson
INVENTOR

BY Victor J. Evans
ATTORNEY

WITNESS:

Patented Jan. 2, 1923.

1,441,154

UNITED STATES PATENT OFFICE.

HENRY W. JOHNSON, OF WALES, NORTH DAKOTA.

HOSE CLAMP.

Application filed April 17, 1922. Serial No. 553,371.

*To all whom it may concern:*

Be it known that I, HENRY W. JOHNSON, a citizen of the United States, residing at Wales, in the county of Cavalier and State of North Dakota, have invented new and useful Improvements in Hose Clamps, of which the following is a specification.

This invention contemplates the provision of a hose clamp, designed to be quickly and easily applied to or removed from the hose as the occasion may require, and one which can be handled in this manner without impairing the shape or configuration of the clamp, and one which can be effectively tightened to prevent leakage or pinching of the hose.

The nature and advantages of the invention will be better understood when the following detailed description is read in connection with the accompanying drawings, the invention residing in the construction, combination and arrangement of parts as claimed.

In the drawing forming part of this application, like numerals of reference indicate similar parts in the several views, and wherein:—

Figure 1:
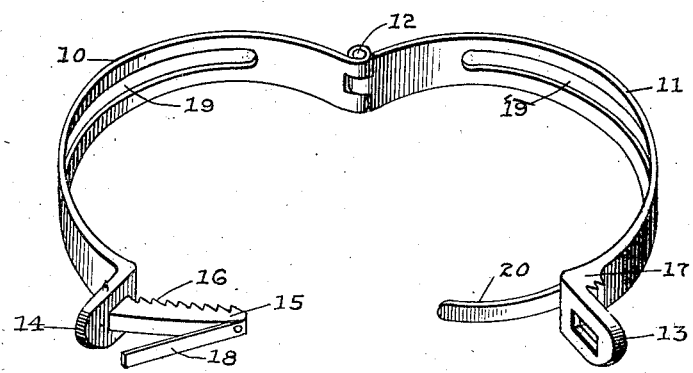
Figure 1 is a perspective view of the clamp showing the sections separated.
Figure 2:
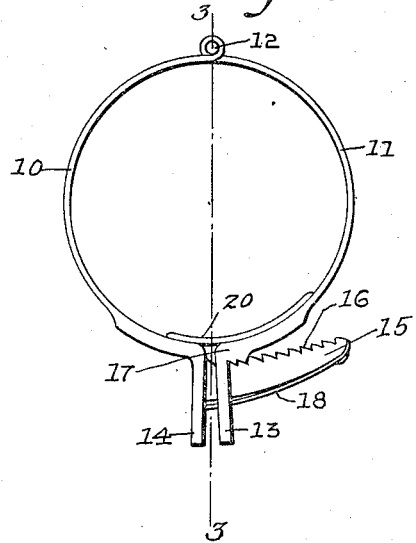
Figure 2 is a view in elevation showing the sections associated.
Figure 3:
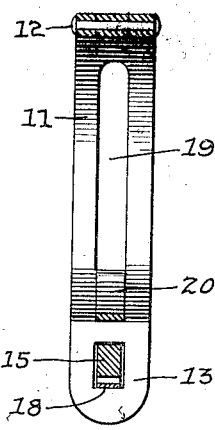
Figure 3 is a sectional view taken on line 3—3 of Figure 2.

The clamp forming the subject matter of the present invention is preferably formed of two semi-circular sections 10 and 11 respectively which are hinged as at 12. The free end of the respective sections terminate to provide lugs 13 and 14 respectively which are arranged in face to face contact, or substantially so in parallel relation when the clamp is in use. The lug 13 is provided with an opening which receives the substantially wedge-shaped finger 15 which is carried by the lug 14, and one side of this finger is provided with teeth 16 which co-operate with the shoulders 17 to effectively hold the sections fixed relatively in clamping relation. Supported by the wedge-shaped finger 15 is a resilient element 18, preferably in the nature of a leaf spring, the latter having one end secured to the finger 15 and its other operating in the opening of the lug 13. This resilient element operates to hold the edge of the finger 15 in effective engagement with the shoulder 17 formed on the section 11. Each section 10 and 11 is slotted as at 19, and the separated portion 20 provided by slotting the section 11, is bent inwardly to provide a curved tongue which bridges the meeting ends of the respective sections to prevent the hose or the like from being pinched or clamped between the meeting ends when the clamp is in use. It is obvious that a clamp of this kind may be very easily applied as well as very easily removed, it only being necessary to make use of a pair of pliers or the like in order to depress the resilient element to permit the finger 15 to slide through the opening in the lug 13. The clamp in its entirety is also very simply constructed; can be manufactured and sold at a very nominal cost.

While it is believed that from the foregoing description, the nature and advantages of the invention will be better understood, I desire to have it known that I do not limit myself to what is herein shown and described, and that such changes may be resorted to when desired as fall within the scope of what is claimed.

What I claim is:

A hose clamp of the character described comprising a pair of pivotally connected sections, lugs offset from the free ends of said sections, said lugs being arranged in parallel relation when the clamp is in use, one of said lugs having an opening, a shoulder formed on one section adjacent said opening, a substantially wedge shaped finger projecting from the other lug and passed through said opening, teeth formed on one side of the finger and adapted to engage said shoulder to hold the section of the clamp in active position, a resilient element carried by said finger and terminally secured thereto, one end of the resilient element bearing against one wall of said opening and operating to hold the finger in effective engagement with said shoulder, and a curved tongue arranged within the clamp and adapted to bridge the meeting ends of said sections for the purpose specified.

In testimony whereof I affix my signature.

HENRY W. JOHNSON.